A. COUESNON.
HORN FOR MOTOR CARS AND OTHER VEHICLES.
APPLICATION FILED FEB. 7, 1912.

1,056,265.

Patented Mar. 18, 1913.

Witnesses
C. S. Swett.
G. M. Copenhaver.

Inventor
Amédée Couesnon
by F. Dittmar
Attorney.

UNITED STATES PATENT OFFICE.

AMÉDÉE COUESNON, OF PARIS, FRANCE.

HORN FOR MOTOR-CARS AND OTHER VEHICLES.

1,056,265. Specification of Letters Patent. Patented Mar. 18, 1913.

Application filed February 7, 1912. Serial No. 675,994.

*To all whom it may concern:*

Be it known that I, AMÉDÉE COUESNON, citizen of the French Republic, residing at Paris, in the Republic of France, have invented certain new and useful Improvements in Horns for Motor-Cars and other Vehicles, of which the following is a specification.

This invention has for its object a horn for motor-cars and other vehicles, which is adapted to be operated by hand or by a controlled pump, and in which there is no reason to fear the blocking of the reed no matter what the strength of the jet of air transmitted by the pump may be, this result being obtained without special parts or accessories.

The accompanying drawing illustrates the device, in which—

Figure 2:
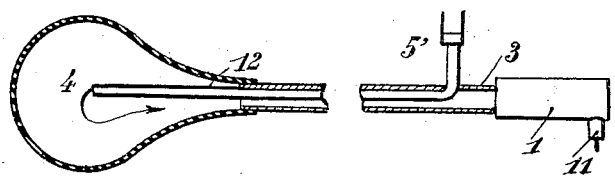
Figure 1:
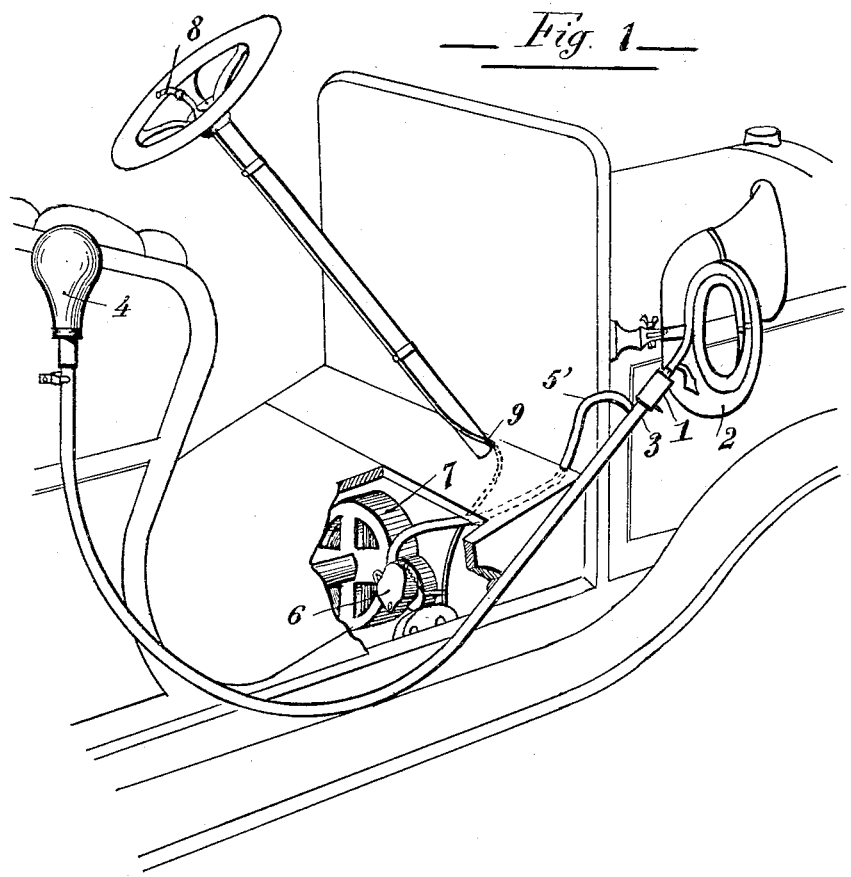

Figure 1, is a general view, in perspective, of the invention, attached to a motor-car; and Fig. 2 is a fragmentary side view of a part of the device, showing details of its internal construction.

In Fig. 1 a horn is shown in which the trumpet, reed 1, and cornet 2 are distant from the bulb 4 and connected to the latter by a pipe 3. The air coming through the pipe 5′ from the pump 6 again enters the pipe 3, but it must escape into the bulb through an internal flexible pipe 12, and from the bulb it passes to the reed through the annular space between the pipes 3 and 12. The horn sounds instantaneously in spite of the space offered to the air by the displacement of the air contained in this space itself.

In Fig. 2 it may be seen that the air enters through the pipe 5′ which connects with the flexible pipe 12, leading into and along one side of the larger pipe 3, and into, approximately, the center of the bulb 4. On pressure of the bulb the air passes out through the space between the flexible pipe 12 and the larger pipe 3, surrounding it and into the reed box 1 and horn 2.

Having now described the invention, I declare that what I claim is:—

1. A hand-operated horn for vehicles comprising an air bulb, a reed, a pipe connecting said bulb with said reed, a fly wheel, a pump driven by said fly wheel, a pipe adapted to convey air from the pump to said first named pipe, a portion of the second named pipe being mounted within said first named pipe and adapted to be spaced from it, said first named pipe constituting an air duct from said bulb to said reed.

2. A hand-operated horn for vehicles comprising an air bulb a reed, a pipe connecting said bulb with said reed, a fly wheel actuated by the vehicle running gear, a pump, a steering member, a button on said steering member to cause said fly wheel to operate said pump, a pipe to convey air from said pump to said first named pipe, a portion of the second named pipe being mounted within said first named pipe and spaced from it and extending into said bulb, said first named pipe constituting an air duct from said bulb to said reed, and an escape valve in said first named pipe.

In witness whereof, I have hereunto signed my name this 22nd day of January 1912, in the presence of two subscribing witnesses.

AMÉDÉE COUESNON.

Witnesses:
ANTONIO MANTERLHET,
H. C. COXE.

---

Copies of this patent may be obtained for five cents each, by addressing the "Commissioner of Patents, Washington, D. C."